United States Patent [19]

Friend

[11] 4,384,590
[45] May 24, 1983

[54] PRESSURE RESPONSIVE PILOT VALVE
[75] Inventor: Ronald G. Friend, Franklin, Mass.
[73] Assignee: Crosby Valve & Gage Company, Wrentham, Mass.
[21] Appl. No.: 269,776
[22] Filed: Jun. 3, 1981
[51] Int. Cl.³ .............................................. F16K 17/10
[52] U.S. Cl. .................................... 137/102; 137/492
[58] Field of Search ............ 137/102, 488, 492, 492.5

[56] References Cited
U.S. PATENT DOCUMENTS

| | | |
|---|---|---|
| 2,477,247 | 7/1949 | Haberland . |
| 2,571,154 | 10/1951 | Mercier . |
| 2,609,832 | 9/1952 | Smith . |
| 2,619,109 | 11/1952 | Garrett . |
| 2,649,115 | 8/1953 | Deardorf . |
| 2,661,023 | 12/1953 | Griswold . |
| 3,010,691 | 11/1961 | Canfield . |
| 3,196,891 | 7/1965 | Valentine ............................ 137/102 |
| 3,211,174 | 10/1965 | Weise .................................. 137/469 |
| 3,294,111 | 12/1966 | Abercrombie ..................... 137/492 |
| 3,304,951 | 2/1967 | Farris ................................... 137/492 |
| 3,373,763 | 3/1968 | Smigles ............................... 137/269 |
| 3,406,712 | 10/1968 | Weise .................................. 137/470 |
| 3,419,030 | 12/1968 | Gratzmuller ....................... 137/102 |
| 3,512,560 | 5/1970 | Weise .................................. 137/102 |
| 3,568,706 | 3/1971 | Weise ............................ 137/492 X |
| 3,664,362 | 5/1972 | Weise .................................. 137/102 |
| 3,726,301 | 4/1973 | Schmidt ............................. 137/102 |

*Primary Examiner*—Robert G. Nilson
*Attorney, Agent, or Firm*—Kenway & Jenney

[57] ABSTRACT

A pressure responsive pilot valve for a pressure relief valve of the type held closed by system pressure applied to a dome over the valve member. The pilot valve has an inlet port exposed to system pressure, an exhaust port and a control port connected to the dome. Below a set system pressure, the pilot valve interconnects the inlet and control ports to pressurize the dome. At the set pressure, the pilot valve interconnects the control and exhaust ports. The set pressure is adjustable by a sleeve threaded in the body and the blowdown is adjustable by a stem extending through the sleeve.

8 Claims, 3 Drawing Figures

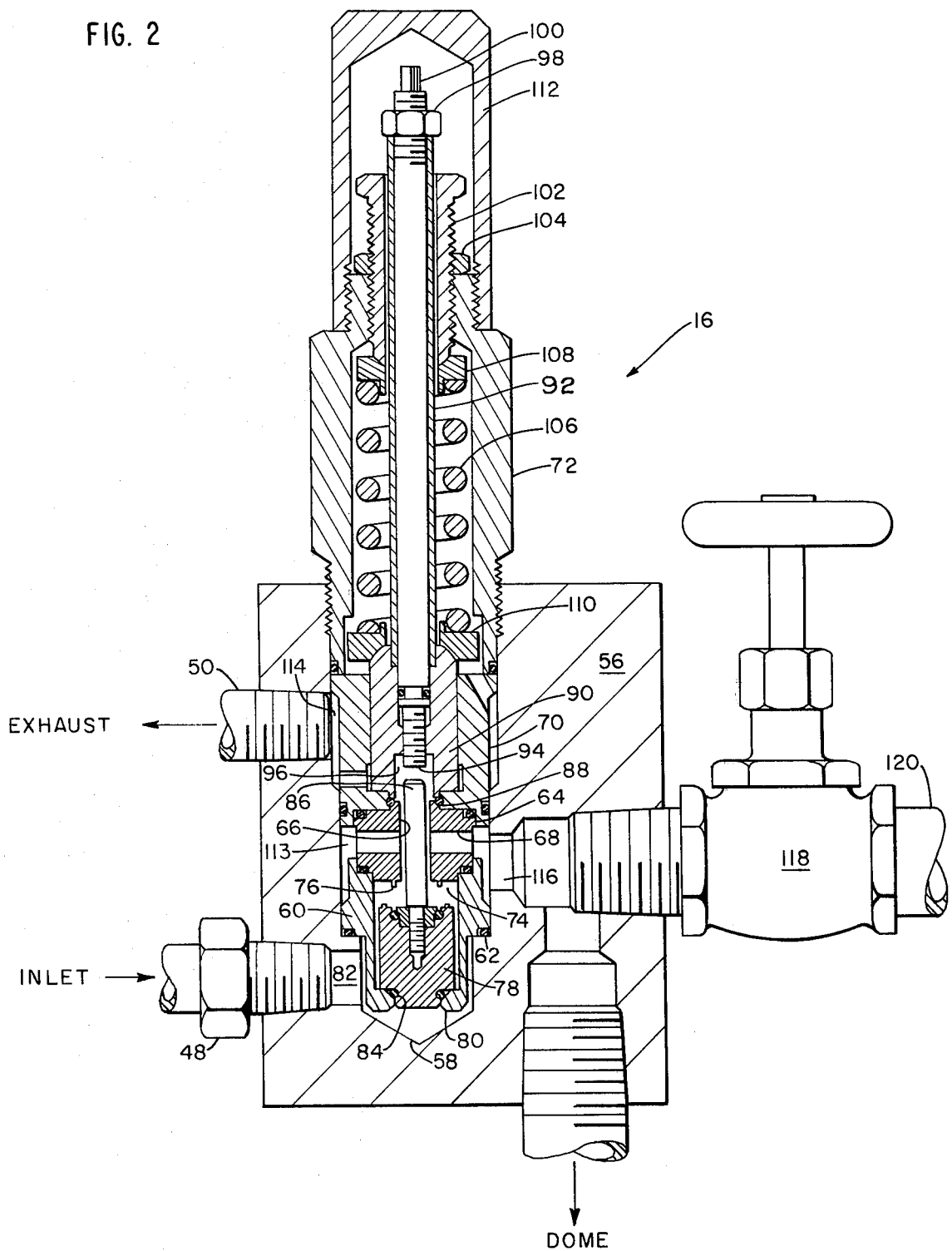

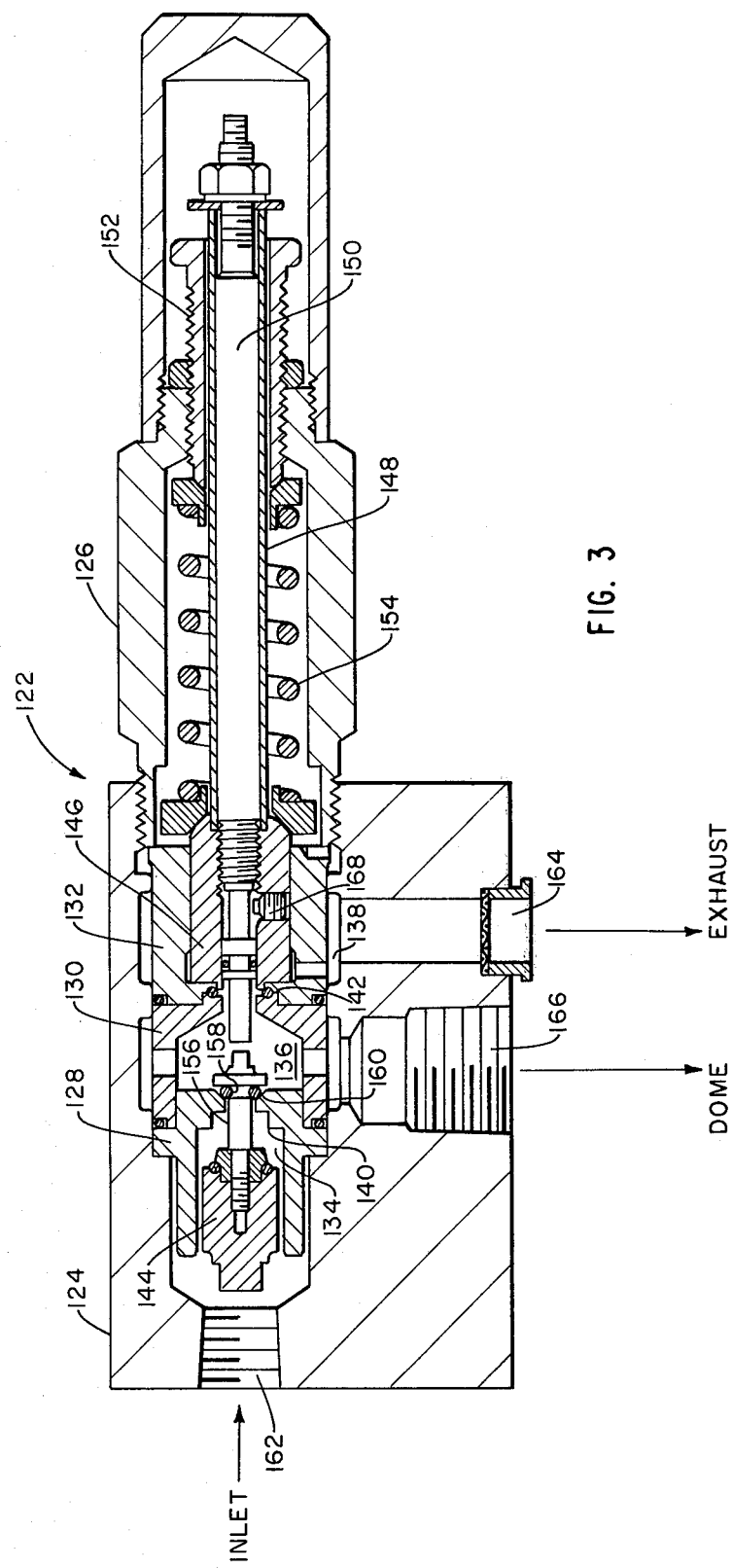

PRESSURE RESPONSIVE PILOT VALVE

SUMMARY OF THE INVENTION

This invention relates generally to fluid pressure relief valves, and more particularly to a pressure responsive pilot valve for operating a pressure relief valve.

Systems under fluid pressure are commonly fitted with pressure relief valves adapted to open and exhaust system fluid at a predetermined set value. When the system pressure has been reduced by a predetermined pressure differential below the set value, such differential being termed the blowdown pressure, the relief valve recloses.

A typical pressure relief valve comprises a nozzle forming a valve seat communicating between the pressurized system and an exhaust port, together with a cooperating valve member and a ported guide sleeve within which the valve member is slidable. The guide sleeve and valve member, together with a plate forming a cover for the body of the valve, define an expansible chamber or dome. Means are provided to apply system pressure to the dome. The effective area of the valve member within the dome exceeds the effective area of the seated valve member that is exposed to the same system pressure. Thus the system pressure normally holds the relief valve closed. Pilot valve means responsive to the system pressure are provided to exhaust fluid from the dome at a set pressure, creating a condition in which the relief valve is held open by the system pressure.

Various kinds of pilot valves have been used for the above purpose. This invention relates to pilot valves of the non-flowing type, in which there is no flow of system fluid through the pilot valve during the period while the relief valve is open. Valves of this type have been provided with separate and independently adjustable means for controlling the set and blowdown pressures. These means are of relatively complex structure, and in some cases the access for adjustments has been relatively limited. In certain cases the adjustments cannot be made with the system pressurized.

With a view to reducing the complexity of construction of pilot valves of the non-flowing type, while providing easily accessible means for independently adjusting the set and blowdown pressures with the system either pressurized or not pressurized, the present invention features a set pressure adjusting sleeve that is threaded in the body, with a blowdown adjusting stem extending through the sleeve, thereby providing a single accessible adjusting position at one side of the pilot valve body, which may be conveniently enclosed by a cap or bonnet.

A second feature of the invention comprises its adaptability for incorporating a check valve for use when a test pressure is applied to the dome. When the test pressure is elevated to the set value, the operation of the pilot valve to relieve the pressure may be induced. During this test the check valve prevents the test fluid from communicating with the pressurized system through the inlet port of the pilot valve.

A further feature resides in the relative simplicity of construction of the pilot valve. Preferably, this comprises a body having an elongate counterbored recess which may be a blind or thru hole, with insert means therein defining inlet, exhaust and control chambers respectively communicating with inlet, exhaust and control ports extending from the recess through the body. The means for adjusting both the set pressure and the blowdown pressure extend from the open end of this recess.

Other features of the invention comprise certain details of construction, configurations and arrangements of the parts, as will be evident from the following description of the preferred embodiments thereof.

DRAWINGS

FIG. 2 is an elevation in section of a first embodiment of a pilot valve according to this invention.

FIG. 3 is an elevation in section of a second embodiment of a pilot valve according to this invention.

DETAILED DESCRIPTION

Figure 1:
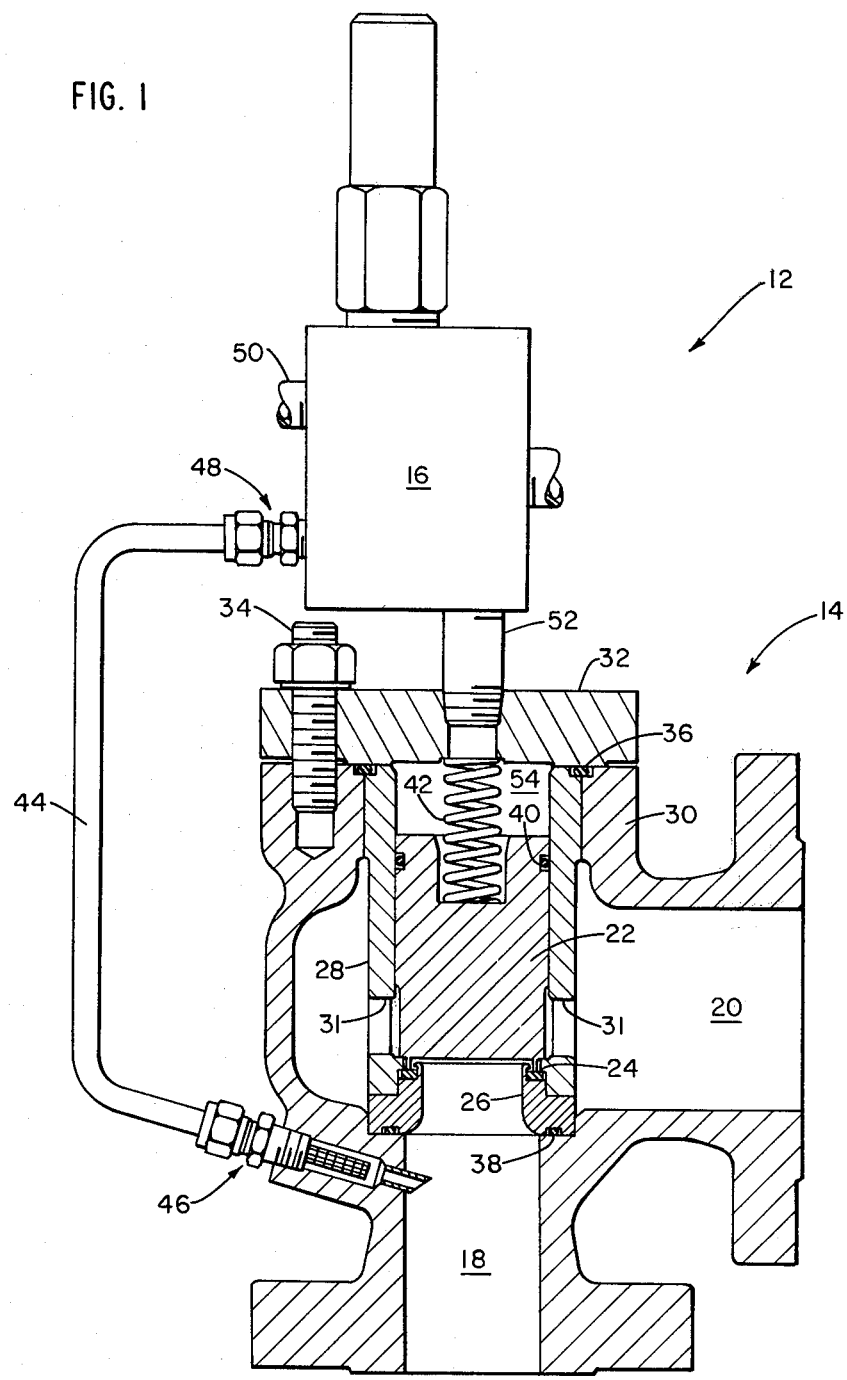
FIG. 1 is an elevation in section of a pressure relief valve system comprising a pressure relief valve and a pressure responsive pilot valve.

Referring to FIG. 1, a complete pressure relief system 12 is illustrated. This comprises a pressure relief valve 14 and a pilot valve 16. The valve 14 has a passage 18 adapted for connection to a system under fluid pressure, for example a pipe system or tank. A passage 20 is provided for exhausting the system pressure by movement of a valve member or disc 22 from its seat 24 communicating with the passage 18. The seat is located on the end of a nozzle 26 fitted on an end of the passage 18, the nozzle being held in place by a guide sleeve 28 received into the body 30 of the valve and having ports 31. A top plate 32 is secured to the body 30 by a plurality of bolts 34 of which one is illustrated. The top plate secures the guide sleeve 28 in position to hold the nozzle 26 firmly against the inner end of the passage 18, and O-rings 36 and 38 provide associated fluid seals. The valve member 22 is sealingly slidable within the sleeve 28, having an O-ring 40 therebetween. A compression spring 42 urges the valve member 22 toward the seat 24.

A system sense line 44 is connected by a fitting 46 to the passage 18, and by an inlet port fitting 48 to the pilot valve 16. The pilot valve is also provided with an exhaust port 50 and a control port connected by a pipe 52 to a dome 54 comprising the expansible chamber defined by the top plate 32, the sleeve 28 and the valve member 22.

FIG. 2 illustrates the pilot valve of FIG. 1 in greater detail. This comprises a body 56 having an elongate countersunk recess 58 into which insert fittings are received. These fittings comprise an insert 60 of sleeve-like form bearing with a sealing O-ring 62 on a shoulder in the recess, an insert 64 bearing on the insert 60 and having an axial passage 66 and one or more radial passages 68 communicating therewith, and a sleeve-like insert 70 bearing on the insert 64. The inserts 60, 64 and 70 are held firmly within the recess 58 by an end of a spring housing 72 threaded into the recess. Fluid seals are provided by O-rings between the respective insert members as shown.

The inserts 60 and 64 define an inlet chamber 74 communicating with the passage 66 through an inlet valve seat 76. This seat is closed by an inlet valve member 78 slidable in the insert 60. The valve member 78 has a number of flat surfaces on its external periphery to provide fluid passages around it. A check valve seat 80 formed on one end of the insert 60 communicates between the inlet port 82 and the inlet chamber 74, and cooperates with check valve means 84 formed on one end of the inlet valve member 78. The member 78 has a rod 86 threaded into it and extending coaxially with the member 78 through the axial hole 66 in the insert member 64.

The insert members 64 and 70 jointly retain an O-ring which forms an exhaust valve seat 88. The exhaust valve seat cooperates with an exhaust valve member 90 slidable in the insert member 70. A tube 92 is received into a recess in the valve member 90 and slidably receives a blowdown adjusting stem 94. The stem 94 is threaded adjustably into the valve member 90 and projects an adjustable distance into a recess 96 formed in the latter. The stem 94 has a lock nut 98 threaded over it in position to bear frictionally on the end of the tube 92. Wrench flats 100 are formed on the projecting end of the stem 94.

A set pressure adjusting sleeve 102 having wrench flats at one end is slidably received over the tube 92 and adjustably threaded into the spring housing 72. A lock nut 104 is threaded over the sleeve 102 and frictionally engageable with the end of the housing 72.

A helical compression spring 106 having end caps 108 and 110 bears at one end on the set pressure adjusting sleeve 102 and at the other end on the exhaust valve member 90.

A protective cap or bonnet 112 is threaded on the housing 72 and covers both the set pressure adjusting sleeve 102 with its lock nut 104 and the blowdown adjusting stem 94 with its lock nut 98.

The insert members 60, 64 and 70 have annular recesses forming a control chamber 113 and an exhaust chamber 114. The control chamber communicates with a control port 116 connected with the dome 54, and the exhaust chamber 114 communicates with the exhaust port 50.

In operation under normal system pressure conditions, the exhaust valve member 90 is seated because the force of the spring 106 exceeds the opposing pressure force exerted on the exhaust valve member by the pressure within the dome 54, which communicates with the control chamber 113 and is applied via a clearance space around the rod 86 to the valve member 90. The system pressure at the passage 18 in the relief valve 12 communicates via the sense line 44 with the inlet port 82, and is sufficient to unseat the check valve means 84. This inlet pressure communicates with the control chamber 113 via the clearance spaces around the inlet valve member 78 and around the rod 86, and these connections provide the source of pressure fluid within the dome and the passages connected therewith. Under these conditions, the inlet valve 78 is not seated upon the inlet valve seat 76 because the rod 86 abuts the end of the blowdown adjusting stem 94 to hold the member 78 an adjustable distance from the seat 76. Under the above-described conditions, the system pressure is thus communicated to the dome, is not exhausted through the pilot valve 16, and may rise and fall to levels below the set pressure as determined by the adjustment of the sleeve 102.

If the system pressure which is present within the control chamber 113 reaches the set pressure, the pressure force on the exhaust valve 90 exceeds the opposing force of the spring 106 and the exhaust valve cracks open, allowing fluid to flow into the exhaust chamber 114 and to the exhaust port 50. As soon as the exhaust valve 90 cracks open, its effective area exposed to the control chamber pressure is substantially increased, causing the exhaust valve to move immediately a substantial distance to an open position where the spring and pressure forces on it are equal. This distance exceeds that by which the inlet valve member was previously spaced from its seat, whereby the latter are now allowed to engage. Thus, after completion of this initial movement, system fluid in the passage 18 of the relief valve cannot flow through the sense line 44 to the control chamber 113; the rod 86 is disengaged from the blowdown adjusting stem 94; and there is a net pressure force on the inlet valve member 78 holding it in the seated position due to the differential between the system pressure at the inlet port 82 and the lower pressure in the control chamber 113 resulting from the exhaust of fluid.

The flow of fluid from the dome through the control chamber to exhaust port 50 continues, and as the pressure is reduced the spring 106 begins to move the exhaust valve member 90 back toward its seat. As the control chamber pressure continues to be reduced the valve member 90 will have moved a sufficient distance to cause the blowdown adjusting stem 94 to abut the end of the rod 86. This occurs before the valve 90 has reached its seat 88. At this point an additional force opposing the spring 106 is applied to the valve member 90, this force being equal to the difference between the opposing pressure forces applied to the seated inlet valve member 78. The valve member 90 is thus restrained from closing further until the system pressure applied through the sense line 44 to the inlet chamber 74 has been further reduced a predetermined amount. At this point, the force of the spring 106 is sufficient to overcome the opposing pressure forces on the valve members 78 and 90, and forces the valve member 78 from its seat 76 by pushing upon the rod 86. Once the inlet valve member 78 is unseated, the opposing pressures applied to its two sides become equalized. This in turn permits the exhaust valve member 90 to move immediately to engage its seat 88. System fluid flows through the inlet port 82, the inlet chamber 74, the control chamber 113 and the control port 116 to the dome cavity 54, causing the disc 22 to engage the nozzle 26 at the seat 24, reestablishing the normal condition of the valves.

From the foregoing description it is seen that the blowdown pressure is adjusted by predetermining the spring force exerted on the valve member 90, and transmitted through the adjusting stem 94 to the valve member 78, at the time when the blowdown adjusting stem 94 reaches the rod 86. At this selected spring load, the net pressure force active on the inlet valve member 78 continues to exceed the spring load applied to the exhaust valve member 90, and it requires a further predetermined reduction in the system pressure applied through the sense line 44 before the main valve member 78 cracks open to reestablish the normal valve conditions.

It will be noted that if desired, the described embodiment can be modified by eliminating the rod 86 and extending the end of the blowdown adjusting stem 94 to a point spaced an equivalent distance from the inlet valve member 78.

The embodiment of FIG. 2 is adapted for testing under pressurized conditions. For this purpose a hand valve 118 is connected by a fitting to the control port 116. During normal operation including overpressure conditions, this valve is closed. For test purposes, the valve is opened to connect a source of test pressure (not shown) via a pipe 120 to the control chamber 113. The inlet valve 76, 78 is normally held open. A test pressure above the system pressure causes the check valve means 84 to engage the seat 80. Thus the system is isolated from the test fluid by the check valve. The test pressure may then be elevated to the set pressure to verify the proper operation of the exhaust valve 90.

The embodiment of FIG. 2 is also adapted to permit adjustment of either the set pressure or the blowdown pressure while the system is pressurized. For these purposes, it is only necessary to remove the bonnet 112 and to loosen the appropriate lock nut. The interior of the spring housing preferably communicates with the exhaust chamber and port through a suitable passage as shown, and is isolated from the system pressure by O-ring seals.

FIG. 3 illustrates a second embodiment of the pilot valve, designated generally at 122. This embodiment may also be tested or adjusted with the system pressurized, and differs from that of FIG. 2 primarily in the location of the check valve. The valve 122 has a body 124 into which is threaded a spring housing 126. The housing 126 retains inserts 128, 130 and 132 substantially as in the embodiment of FIG. 2. The inserts define an inlet chamber 134, a control chamber 136 and an exhaust chamber 138. The inserts also define an inlet valve seat 140 and an exhaust valve seat 142 respectively cooperating with an inlet valve member 144 and an exhaust valve member 146. As in the FIG. 2 embodiment, the valve 122 is also provided with a tube 148, a blowdown adjusting stem 150 slidable in the tube, a set pressure adjusting sleeve 152 and a compression spring 154.

The inlet valve member 144 is provided with a rod 156 which extends into the control chamber 136 and includes a check valve member 158 cooperating with a check valve seat 160 formed on the insert 128. An inlet port 162, an exhaust port 164 and a control port 166 communicate with the inlet chamber 134, the exhaust chamber 138 and the control chamber 136, respectively.

The operation of the pilot valve shown in FIG. 3 is substantially similar to that of the valve in FIG. 2 under both normal operating conditions and the overpressure condition. Also, the operation of the valve when it is connected to a source of test pressure is substantially similar to that of FIG. 2. The test pressure is applied by suitable connections (not shown) to the control port 166. This pressure seats the check valve 158, 160 to isolate the system pressure from the control chamber during the test.

In the embodiment of FIG. 3, the rod 156 does not extend through the exhaust valve seat, in contrast to the embodiment of FIG. 2, although it may be modified to extend through such valve seat if desired.

In the embodiment of FIG. 3 a set screw 168 is threaded into the insert 146 to provide abutments appropriately limiting the range of adjustability of the blowdown adjusting stem.

I claim:

1. A pressure responsive pilot valve for actuating a pressure relief valve, comprising the combination of
    a body having an inlet chamber with an inlet port, an exhaust chamber with an exhaust port and a control chamber with a control port,
    an inlet valve seat and an inlet valve member in the inlet chamber,
    an exhaust valve seat and an exhaust valve member in the exhaust chamber, said valve seats being coaxial and each communicating with the control chamber,
    a compression spring urging the exhaust valve against the exhaust valve seat,
    a set pressure adjusting sleeve threaded in the body and bearing on said spring, and
    a blowdown adjusting stem extending through said sleeve, axially adjustably secured to the exhaust valve member, and having an end engageable by the inlet valve member upon movement thereof toward the inlet valve seat.

2. A valve according to claim 1, including a second stem secured to the inlet valve, extending through the inlet valve seat and having an end engageable with the blowdown adjusting stem.

3. A valve according to claim 2, in which the second stem extends through the exhaust valve seat.

4. A valve according to claim 2, having a check valve seat in the control chamber communicating with the inlet chamber, the second stem having a check valve member movable against the check valve seat upon movement of the inlet valve member away from the inlet valve seat.

5. A valve according to claim 1, in which the blowdown adjusting stem is threaded in the exhaust valve member.

6. A valve according to claim 5, having a tube around the blowdown adjusting stem and extending from the exhaust valve member through said sleeve, said sleeve having a locking nut threaded thereon and frictionally engageable with the body, said stem having a locking nut threaded thereon and frictionally engageable with the tube.

7. A valve according to claim 1, in which the body has an elongate recess formed therein and insert means within the recess, the insert means forming the inlet, control and exhaust chambers and the inlet and exhaust valve seats.

8. A valve according to claim 1, in which the inlet chamber has a check valve seat communicating between the inlet port and the inlet valve seat, the inlet valve member having check valve means engageable with the check valve seat upon movement of the inlet valve member away from the inlet valve seat.

* * * * *